March 3, 1953 W. W. SCOTT 2,629,934
PIPE MEASURING DEVICE
Filed Aug. 6, 1949 2 SHEETS—SHEET 1
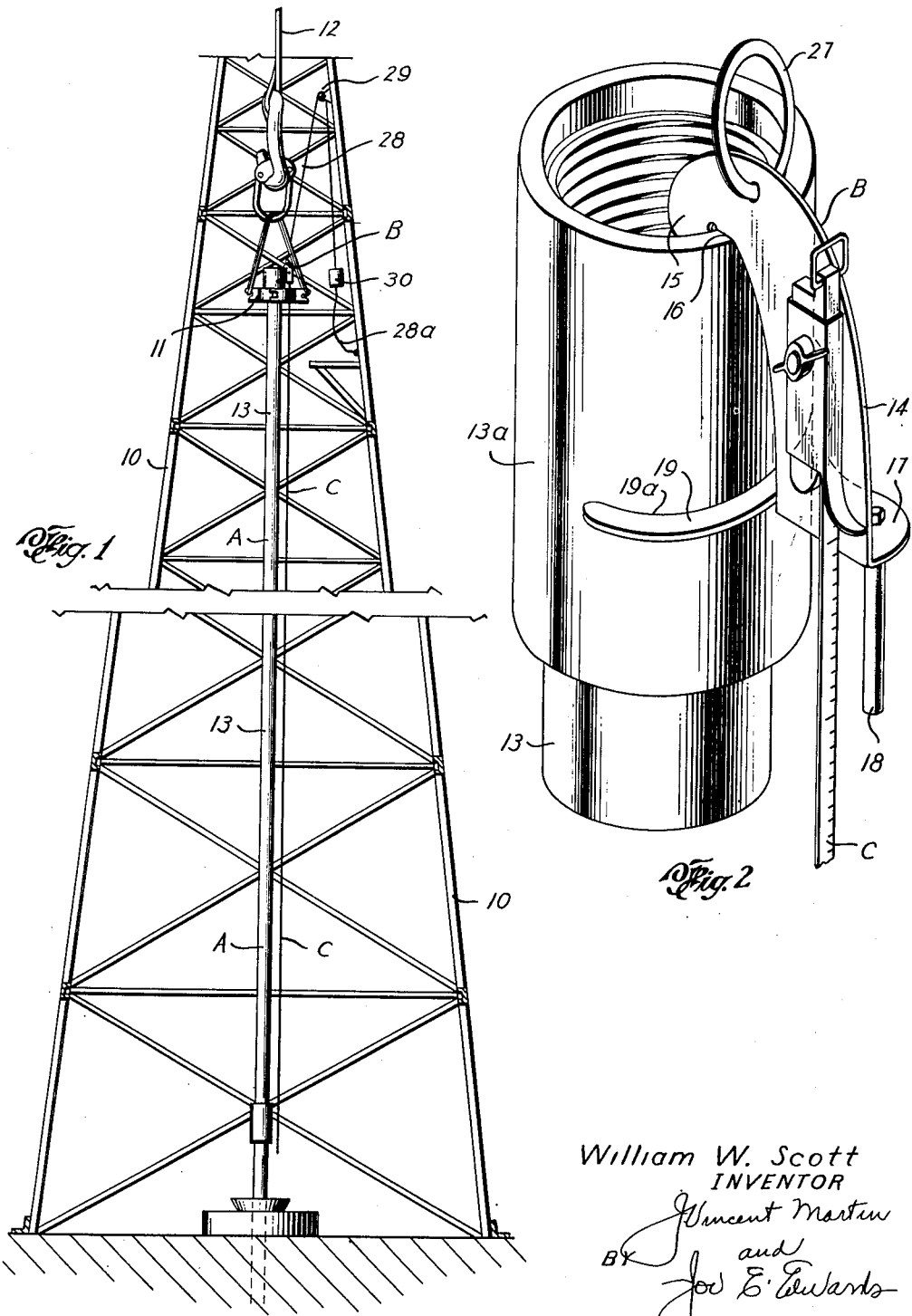
William W. Scott
INVENTOR March 3, 1953 W. W. SCOTT 2,629,934
PIPE MEASURING DEVICE
Filed Aug. 6, 1949 2 SHEETS—SHEET 2
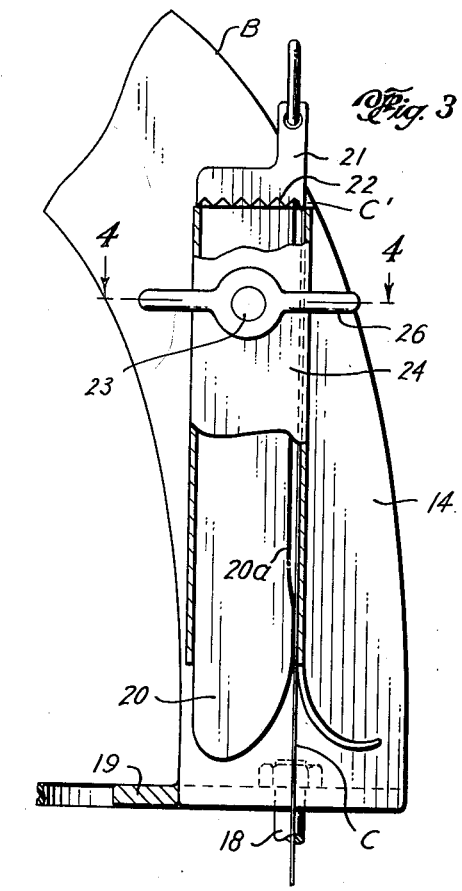
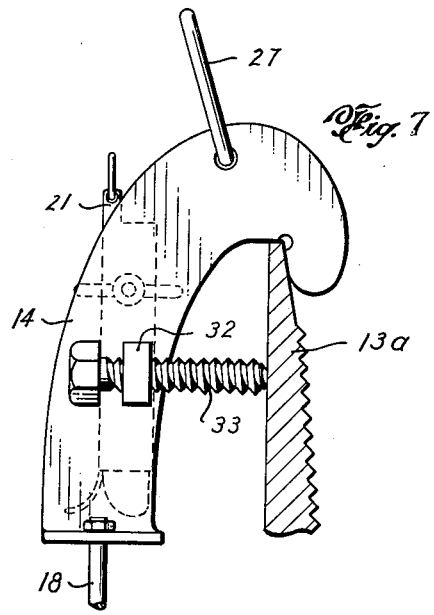
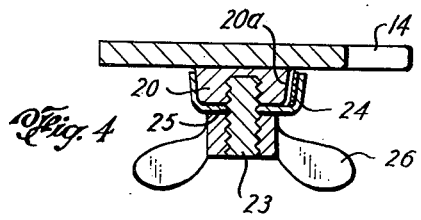
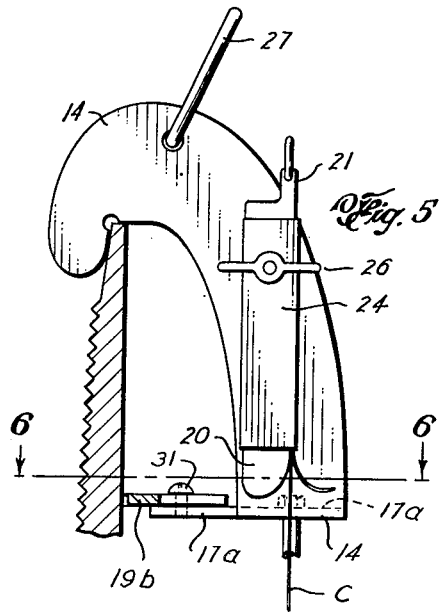
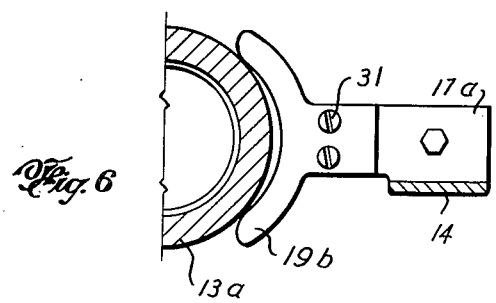
William W. Scott
INVENTOR.
BY Vincent Martin
and
Joe E. Edwards
ATTORNEYS Patented Mar. 3, 1953

2,629,934

UNITED STATES PATENT OFFICE 2,629,934

PIPE MEASURING DEVICE

William W. Scott, Dallas, Tex.

Application August 6, 1949, Serial No. 109,024

5 Claims. (Cl. 33—137)

This invention relates to new and useful improvements in pipe measuring devices.

It is desirable in oil well operations to determine the exact length of the pipe which is lowered into the well bore and such measurements have been made by use of ordinary measuring tapes. Not only do the pipe stands vary somewhat in length but also it will be appreciated that because of the great length and weight, as well as the stretch of the pipe string, the total over-all length of the string in the hole will be substantially greater than the sum of the normal lengths of the many connected stands of pipe which make up the string. It is, therefore, desirable that measurement of the pipe be accomplished while the pipe is suspended within the derrick so that a true measurement of the string in its stretched position may be obtained.

It is one object of the present invention to provide an improved pipe measuring device which will facilitate the accurate measurement of the pipe stands which make up the pipe string; said device permitting the stands to be measured either individually in an unstretched position or as said stands are being run in or removed from the well bore to measure the same while in a stretched condition.

An important object of the invention is to provide an improved pipe measuring device which includes a supporting member to which the measuring tape is attached which member may be readily engaged and properly aligned with the upper end of the pipe, whereby the tape may hang vertically in parallel relationship to the pipe being measured, whereby accurate measurement in a minimum time may be accomplished.

Another object of the invention is to provide an improved measuring device of the character described wherein the tape supporting member is provided with a hook portion engageable over the pipe and, with the device being so constructed that when in a position engaged with a pipe, the upper end of the pipe is accurately aligned with the zero indication on the tape, the device being offset whereby the tape may clear the pipe supporting elevators or other projections and may hang in a truly vertical position which assures accurate measurement.

A further object of the invention is to provide a measuring device of the character described having means for suspending the tape in a true vertical position adjacent the pipe being measured.

A still further object is to provide a pipe measuring device having improved clamping means for attaching the measuring tape thereto, whereby proper positioning of the tape with respect to the pipe under measurement is assured.

Other and further objects of the invention will appear from the description of the invention.

In the accompanying drawings, which form a part of the instant specification, which are to be read in conjunction therewith and wherein like reference numerals are used to indicate like parts in the various views:

Figure 1 is a partial elevation of a well derrick having a pipe suspended therein and illustrating a measuring device constructed in accordance with the invention engaged with said pipe, Figure 2 is an isometric view of the measuring device and showing the same engaged over the upper end of the pipe, Figure 3 is a view partly in section and partly in elevation showing the clamping means for the upper end of the tape, Figure 4 is a horizontal cross-sectional view taken on the line 4—4 of Figure 3, Figure 5 is a view partly in section and partly in elevation of the lower portion of the device and showing a modified form of guide member, Figure 6 is a horizontal cross-sectional view taken on the line 6—6 of Figure 5, and Figure 7 is a side elevation of a modified form of still another modification of the device.

In the drawings, the numeral 10 designates a well derrick which is of usual construction and which is shown as having a pipe string A suspended therein by means of the usual pipe elevators 11. The elevators are supported by the usual cable or line 12. It is desirable that each stand of pipe be measured either individually before it is connected to the remaining stands of the pipe string or after it has been connected in said string, and for this purpose the improved pipe measuring device B is adapted to be engaged over the upper end of the uppermost stand of the string as it is suspended within the derrick. The device B includes a measuring tape C which hangs vertically throughout the length of the pipe stand 13 so that an accurate measurement of the stand may be made. The zero indication of the tape C is properly aligned as will be explained with the upper end of the pipe stand and thus, a workman on the derrick floor may readily read the tape adjacent the lower end of the stand being measured to ascertain the exact length of said stand.

The device B is clearly shown in Figure 2 and includes a main supporting body or plate 14 which is formed with a hook 15 at its upper end. At the intersection of the hook 15 with the body portion a flat surface 16 is provided, and when the hook is engaged over the upper end of a pipe stand 13 or over the upper end of a tool joint 13a which is secured to the pipe, the flat portion 16 rests upon the edge of the pipe or the pipe joint, as the case may be. The lower end of the body or plate 14 of the device is bent outwardly to form a laterally directed flange 17 and this flange may have the upper end of a handle 18 bolted or otherwise secured thereto. At the inner portion of the flange an arcuate guide 19 is formed and as is illustrated, this guide is integral with the flange 17. The inner arcuate surface 19a of the guide 19 may be disposed on the same radius as the radius of the pipe or tool joint which is to be engaged, or it may be of a slightly different radius to provide a two point contact with the pipe and said guide functions to maintain the main body or plate 14 outwardly in spaced relation to the pipe surface. The guide also stabilizes the device when the same is in engaged position with the pipe or tool joint.

For securing the upper end of the measuring tape C to the device an elongate lug or base member 20 is secured to one side of the body or plate 14, being preferably welded thereto. The disposition of the lug or base member 20 is such that when the device is in engaged position over the pipe 13 or joint 13a with the arcuate guide 19 engaging the outer surface of the pipe or joint and holding the body or plate 14 in offset position, the vertical edge portion 20a of the lug or base member is disposed in a true vertical plane in longitudinal alignment with the pipe to be measured. Thus the guide functions to hold the main body in spaced relationship to the pipe and also assures proper vertical disposition of the lug surface 20a.

The tape C which has its zero indication at the point C' has an end piece 21 secured thereto and this end piece has its lower surface serrated at 22 and adapted to rest upon the upper end of the lug or base member 20. It will be evident that when the end piece 21 is placed upon the upper end of the lug or base member 20 the measuring tape C may hang vertically along the vertical surface 20a of the lug 20. The upper end of the lug is in true horizontal alignment or in the same horizontal plane as the flat portion 16 which is formed between the hook 15 and the body 14, and thus the zero indication C' of the tape is automatically aligned with the straight portion 16 when the end piece is placed in position on the lug or base member. The arrangement assures proper alignment of the zero indication on the tape with the upper end of the pipe or pipe joint which is engaged by the hook.

For clamping the upper portion of the tape to the lug or base member said lug is formed with an outwardly extending stud 23 which is disposed near its upper end. A generally U-shaped clamping plate 24 is adapted to fit over the lug or base member and over the tape C which is hanging vertically along the edge 20a. The clamp has an opening 25 through which the stud 23 extends and a wing nut 26 which is adapted to be tightened upon the stud firmly mounts the clamp in position on the lug or base member. It will be evident that the clamp prevents displacement of the upper portion of the tape and maintains the end piece 21 in firm engagement with the end of said lug or base member and yet provides a quickly releasable means which allows attachment of the tape. It is noted that since the main body or plate 14 is maintained in spaced relationship to the pipe, the tape C hangs vertically in longitudinal alignment with the pipe and said tape is also spaced from the pipe whereby it clears the elevators or other projections on said pipe.

A suitable ring 27 is secured to the upper portion of the device and may be connected to a suitable supporting cable 28. As shown, one end of the supporting cable 28 (Figure 1) is secured to the ring and said cable passes over an idler pulley 29 mounted in the derrick 10 and its opposite end is attached to a counterbalancing weight 30. The weight has connection through a tie cable 28a with the derrick. With this arrangement, the device B having the measuring tape C suspended or hanging therefrom is thus mounted for easy manipulation within the derrick, preferably at a point adjacent to the usual station for the derrick man but, of course, other means of suspending the device may be provided.

In using the device B the stand of pipe is suspended from the usual elevators 11 and may be unattached from the remainder of the pipe string. In such case, the hook 15 is engaged over the upper end of the stand or over the upper end of the tool joint connected thereto and when so engaged the arcuate guide 19 abuts the outer surface of the pipe or joint to hold the body 14 spaced from the pipe and also locates the edge 20a of the lug in a vertical plane. The straight portion 16 between the hook 15 and body 14 lies in the same horizontal plane as the upper end of the lug 20 and thus when the tape C is clamped in position on the lug, the zero indication C' of the measuring tape is accurately aligned with the upper end of the pipe. Not only does the arcuate guide 19 hold the body 14 in offset or spaced position with respect to the pipe and at the same time maintain the vertical edge 20a of the lug or base member 20 in a truly vertical position but also said guide stabilizes the device to prevent its accidental movement or displacement from its engaged position. It will be evident that the floor man on the floor of the derrick can accurately read the lower end of the tape to properly measure the pipe stand.

If the pipe stand is unconnected to the remainder of the string the measurement will provide a measurement of the normal length of said stand; however, if the pipe is connected in the string it will be evident that the measurement made will be that of the pipe stand under load or stretch since the weight of the pipe string will at this time be imposed upon the stand under measurement.

The device is exceptionally simple in construction and is manipulated by the derrick man at his station in the upper portion of the derrick. It is evident that the pipe may be measured while suspended in the derrick or racked therein or may be measured while it is being run into or being removed from the well bore. As an example, if the pipe is being removed from the well bore the hook 15 is engaged over the end of the pipe as the same is moved upwardly by the cable 12 and elevators 11, such engagement being made by the derrick man as the upper portion of the pipe passes his station. After the measurement is made the device is easily removed by manipulating the cable 28a after which the uppermost pipe stand is disconnected and stacked at the side of the derrick. Disengagement of the device B from the upper end of such stand is readily accomplished and the counterbalancing weight 30 facilitates this disconnection. The device then remains supported by its cable 28 until the next pipe stand moves up into position. The handle 18 which is secured to the lower end of the device B is provided for convenience in handling the device In Figures 1-4, the body 14, hook 15, flange 17 and arcuate guide 19 are all illustrated as made of one piece of material bent to the proper shape. Obviously, this construction decreases manufacturing costs but because the arcuate guide 19 must engage the outer surface of the pipe in order to properly position the tape each size pipe or a limited range of pipe will require a device having a guide of a different radius. In order to permit one device to be employed for various size pipes it is possible to make the arcuate guide 19 separate from the remainder, and in Figures 5 and 6 such an arrangement is illustrated. In this form an arcuate guide 19b is adapted to be secured to an ear or extension 17a which is formed on the flange 17 of the body 14. Suitable screws 31 may be employed for fastening the guide 19b in position. In this form of the invention it will be apparent that guides 19b of different sizes may be readily interchanged to permit use of the device with pipes of varying diameters.

In Figure 7 still another form of the invention is shown wherein the arcuate guide 19 of Figure 2 and guide 19b of Figure 6 is completely eliminated. In this form an outwardly extending ear 32 is welded or otherwise secured to the side of the body or plate 14, such ear being disposed on the side opposite the side on which the lug or base member is secured. An adjustable screw 33 is threaded through the ear 32 and has its inner end adapted to engage the outer surface of the pipe being measured. It will be apparent that the inner end of the screw will contact the outer surface of the pipe and will function in the same manner as the arcuate guide which engages said pipe to assure proper suspension of the tape C in a vertical plane. With the arrangement shown in Figure 7 the screw 33 may be adjusted with respect to the ear 32 within which it is threaded to move the end of the screw inwardly and outwardly with respect to the device, whereby said device may be applied to pipes of different diameters.

In all forms of the invention the hook 15 is engaged over the end of the pipe and the lug or base member 20 to which the tape is attached is maintained in a truly vertical position by the engagement of either the guides 19 and 19b or the screw 33. At the same time, the zero indication of the tape is accurately aligned with the upper end of the pipe and thus, the tape will permit accurate measurement of the length of said pipe. The U-shaped clamp 24 which engages over the base member and over the upper portion of the tape provides a simple and effective means for securely fastening the tape to the device. As has been noted, the device may be employed to measure the normal length of any pipe stand suspended or stacked within the derrick or may be utilized to make the measurements while the pipe is being run into or removed from the well bore.

The length of the body or plate 14 is of course subject to variation so that the space between the point of contact of the guide or screw and the upper end of the pipe is variable. Also, it is noted that other types of clamps for clamping the tape to the device may be employed.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

Having described the invention, I claim:

1. In combination with a vertically suspended pipe to be measured, a pipe measuring device including, a main body, a hook portion at the upper end of the body adapted to be engaged over the end of the pipe to be measured, a measuring tape, a lug element secured to one side of the body and having its upper end aligned with the supporting edge of the hook portion, which edge engages the pipe end, a clamping member adapted to be frictionally engaged with the lug element, the upper portion of the measuring tape being insertable between the element and clamping member, whereby said tape is suspended from the body, and means carried by the body for engaging the outer surface of the pipe being measured when the hook portion is engaged over the pipe end for maintaining the suspended tape in longitudinal alignment with the pipe to facilitate accurate measurement of said pipe.

2. In combination with a vertically suspended pipe to be measured, a pipe measuring device including, a main body, a hook portion at the upper end of the body adapted to be engaged over the end of the pipe to be measured, a measuring tape, a lug element secured to one side of the body and having its upper end aligned with the supporting edge of the hook portion, which edge engages the pipe end, a clamping member adapted to be frictionally engaged with the lug element, the upper portion of the measuring tape being insertable between the element and clamping member, whereby said tape is suspended from the body, and an arcuate guide carried by the body and having its inner surface on a radius which is the same as the radius of the pipe being measured and adapted to engage the outer surface of the pipe when the hook portion is engaged over the pipe, and said guide functioning to maintain the suspended tape in longitudinal alignment with the pipe to facilitate accurate measurement of said pipe.

3. In combination with a vertically suspended pipe to be measured, a pipe measuring device including, a main body, a hook portion at the upper end of the body adapted to be engaged over the end of the pipe to be measured, a measuring tape, a lug element secured to one side of the body, a clamping member adapted to be frictionally engaged with the lug element, the upper portion of the measuring tape being insertable between the element and clamping member, whereby said tape is suspended from the body, and means carried by the body for engaging the outer surface of the pipe being measured when the hook portion is engaged over the pipe end for maintaining the suspended tape in longitudinal alignment with the pipe to facilitate accurate measurement of said pipe, the lug element being so positioned with respect to the hook portion that the upper end of the measuring tape which is clamped to said lug element is disposed in the same horizontal plane as the upper end of the pipe when the hook portion is engaged over the pipe end.

4. The combination as set forth in claim 2, wherein the arcuate guide means is detachably connected to the body, whereby said guide is readily interchangeable with guides of other sizes to permit the device to be employed with various size pipes.

5. In combination with a vertically suspended pipe to be measured, a pipe measuring device including, a main body, a hook portion at the upper end of the body adapted to be engaged over the end of the pipe to be measured, a measuring tape, a lug element secured to one side of the body, a clamping member adapted to be frictionally engaged with the lug element, the upper portion of the measuring tape being insertable between the element and clamping member, whereby said tape is suspended from the body, and an adjusting screw carried by the body and having its inner end adapted to engage the outer surface of the pipe being measured when the hook portion is engaged over the pipe end for maintaining the suspended tape in longitudinal alignment with the pipe to facilitate accurate measurement of said pipe.

WILLIAM W. SCOTT.

REFERENCES CITED

The following references are of record in the file of this patent:

UNITED STATES PATENTS

| Number | Name | Date |
|---|---|---|
| 1,003,626 | Malcolm | Sept. 19, 1911 |
| 2,028,836 | Holgate | Jan. 28, 1936 |
| 2,342,234 | Abegg | Feb. 22, 1944 |
| 2,453,115 | Brown | Nov. 9, 1948 |
| 2,466,405 | Fowler | Apr. 5, 1949 |
| 2,544,908 | Winston | Mar. 13, 1951 |